(12) United States Patent
Greeter et al.

(10) Patent No.: US 11,410,447 B2
(45) Date of Patent: Aug. 9, 2022

(54) INFORMATION SECURITY ASSESSMENT TRANSLATION ENGINE

(71) Applicant: Bank of America Corporation, Charlotte, NC (US)

(72) Inventors: Jason Todd Greeter, Charlotte, NC (US); Jose Antonio Covaria, Charlotte, NC (US); Allan Wayne Avellanet, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 224 days.

(21) Appl. No.: 16/906,381

(22) Filed: Jun. 19, 2020

(65) Prior Publication Data

US 2021/0397831 A1 Dec. 23, 2021

(51) Int. Cl.
*G06V 30/416* (2022.01)
*H04L 9/40* (2022.01)

(52) U.S. Cl.
CPC ........ *G06V 30/416* (2022.01); *H04L 63/1433* (2013.01); *H04L 63/20* (2013.01)

(58) Field of Classification Search
CPC .... G06V 30/416; H04L 63/1433; H04L 63/20
USPC ......................................................... 726/25
See application file for complete search history.

(56) References Cited

U.S. PATENT DOCUMENTS

| | | |
|---|---|---|
| 6,636,585 B2 | 10/2003 | Salzberg et al. |
| 6,643,625 B1 | 11/2003 | Acosta et al. |
| 6,912,502 B1 | 6/2005 | Buddle et al. |
| 7,305,351 B1 | 12/2007 | Bechhofer et al. |
| 7,433,829 B2 | 10/2008 | Borgia et al. |
| 7,512,602 B2 | 3/2009 | Broder et al. |
| 7,590,647 B2 | 9/2009 | Srinivasan et al. |
| 7,627,891 B2 | 12/2009 | Williams et al. |
| 7,672,884 B2 | 3/2010 | Schuster et al. |
| 7,747,495 B2 | 6/2010 | Malaney et al. |
| 7,849,048 B2 | 12/2010 | Langsetli et al. |
| 7,849,049 B2 | 12/2010 | Langsetli et al. |
| 7,930,322 B2 | 4/2011 | MacLennan |
| 8,112,413 B2 | 2/2012 | Krishna et al. |
| 8,214,346 B2 | 7/2012 | Pradhan et al. |
| 8,250,026 B2 | 8/2012 | Mok et al. |
| 8,296,334 B2 | 10/2012 | McDonald |
| 8,396,838 B2 | 3/2013 | Brockway et al. |

(Continued)

OTHER PUBLICATIONS

"Global Perspectives and Insights Artificial Intelligence—Considerations for the Profession of Internal Auditing Special Edition," *The Institute of Internal Auditors, Inc.*, 2017, 9 pages.

(Continued)

*Primary Examiner* — Kambiz Zand
*Assistant Examiner* — Aubrey H Wyszynski

(57) ABSTRACT

A system is configured for assessing information security in a network. The system identifies portions of documents that contain information that is responsive to questions about an entity's compliance with network user requirements. The system then determines whether the identified information meets network user requirements. The system also calculates a confidence interval for its determinations. A report is generated to display the system's determinations and the associated confidence intervals for those determinations.

20 Claims, 5 Drawing Sheets

(56) References Cited

U.S. PATENT DOCUMENTS

| | | | |
|---|---|---|---|
| 8,448,126 | B2 | 5/2013 | Laight et al. |
| 8,504,553 | B2 | 8/2013 | Vailaya et al. |
| 8,515,939 | B2 | 8/2013 | Chen et al. |
| 8,577,829 | B2 | 11/2013 | Subrahmanyam et al. |
| 8,606,595 | B2 | 12/2013 | Udani |
| 8,620,909 | B1 | 12/2013 | Rennison |
| 8,682,674 | B1 | 3/2014 | Komissarchik et al. |
| 8,769,412 | B2 | 7/2014 | Gill et al. |
| 8,914,299 | B2 | 12/2014 | Pesci-Anderson et al. |
| 8,914,414 | B2 | 12/2014 | Jacobson et al. |
| 9,497,312 | B1 * | 11/2016 | Johansson ............. H04L 63/107 |
| 9,715,491 | B2 | 7/2017 | Stollman |
| 9,716,721 | B2 | 7/2017 | Hovor et al. |
| 9,760,340 | B2 | 9/2017 | Jayaraman et al. |
| 9,842,204 | B2 | 12/2017 | Bailey |
| 10,019,677 | B2 | 7/2018 | Gill et al. |
| 10,033,766 | B2 | 7/2018 | Gupta et al. |
| 10,121,150 | B2 | 11/2018 | Gajendragadkar et al. |
| 10,303,798 | B2 | 5/2019 | Stubley et al. |
| 10,423,708 | B2 | 9/2019 | Davis et al. |
| 10,565,502 | B2 | 2/2020 | Scholtes |
| 10,887,348 | B1 * | 1/2021 | Brandwine ............. H04L 63/20 |
| 2013/0246914 | A1 * | 9/2013 | Millefiorini ............. G06F 16/93 |
| | | | 715/268 |
| 2013/0304761 | A1 | 11/2013 | Redlich et al. |
| 2015/0254791 | A1 * | 9/2015 | Stockton ............ G06Q 10/0635 |
| | | | 705/7.28 |
| 2015/0281287 | A1 | 10/2015 | Gill et al. |
| 2016/0321582 | A1 | 11/2016 | Broudou et al. |
| 2017/0147685 | A1 | 5/2017 | Iqbal |
| 2017/0236034 | A1 | 8/2017 | Dolev |
| 2018/0322510 | A1 | 11/2018 | Cleaver et al. |
| 2019/0014153 | A1 | 1/2019 | Lang et al. |
| 2019/0108290 | A1 | 4/2019 | Kowitz |
| 2019/0188293 | A1 | 6/2019 | Argyros et al. |
| 2019/0318364 | A1 | 10/2019 | Marascu et al. |
| 2020/0019558 | A1 | 1/2020 | Okorafor et al. |

OTHER PUBLICATIONS

"Natural language processing: A more fluent audit," *KPMG*, https://home.kpmg/au/en/home/insights/2019/03/audit-technology-natural-language-processing.html, Mar. 27, 2019, 4 pages.

Bizarro et al., "The Intelligent Audit Opens in modal lightbox," isaca.org, www.isaca.org/currentissue, Nov. 1, 2019, 13 pages.

Struthers-Kennedy et al., "Artificial Intelligence and Internal Audit: A Pragmatic Perspective," protiviti.com, https://blog.protiviti.com/2020/01/02/artificial-intelligence-and-internal-audit-a-pragmatic-perspective/, Jan. 2, 2020, 5 pages.

* cited by examiner

| QUESTION | REQUIREMENT MET? | SUPPORTING DOCUMENTS | CONFIDENCE INTERVAL |
|---|---|---|---|
| 8-CHARACTER PASSWORD | YES | DOCUMENT #1; pg. 90, line 6 | 92% |
| MOBILE DEVICES ENCRYPTED | YES | DOCUMENT #20 | 91% |
| NETWORK FIREWALLS | NO | DOCUMENT #9; pg. 17, paragraph 4 | 94% |
| ANTIVIRUS SOFTWARE | YES | DOCUMENT #9; pg. 21, paragraph 2 | 81% |

FIG. 5

INFORMATION SECURITY ASSESSMENT TRANSLATION ENGINE

TECHNICAL FIELD

This disclosure relates generally to information security. More specifically, this disclosure relates to an information security assessment translation engine.

BACKGROUND

Entities receive products and services from a variety of vendors. Some vendors have access to sensitive information and network elements of the organization. Additionally, certain vendors are subject to various governmental regulations and/or industry standards. Network security depends on each vendor complying with various information security protocols. These protocols are only effective if each vendor complies with them.

Verifying compliance with information security protocols entails analyzing documents from a variety of sources that are in a variety of formats. The mixture of structured and unstructured data in the various documents makes it difficult for computer analysis. Even within those documents comprised purely of structured data, different optical character recognition programs may produce nonuniform results. If data is inaccurately extracted from documents, then any decisions that a computer makes based on that data may also be incorrect. These drawbacks result in limited document throughput. This in turn slows the computer's ability to make decisions, leaving network vulnerabilities undetected for longer periods of time.

SUMMARY OF THE DISCLOSURE

According to one embodiment, a system for assessing information security in a network includes a memory and a processor. The memory stores a list of network user requirements that parties must comply with when they use the network. The memory also stores a list of metrics that satisfy each of the network user requirements. The processor is generally configured to analyze one or more documents associated with a network user. The processor identifies a first portion of a document associated with the network user that contains information that is responsive to a first question about the network user's compliance with a first network user requirement. The processor also identifies a second portion of the document that is responsive to a second question about the network user's compliance with a second network user requirement. The processor then compares the information in the first and second portions of the document with the list of metrics that meet the network user requirements. Based on this comparison, the processor makes several determinations. The processor makes a first determination that the information in the first portion of the document meets the first network user requirement. The processor also makes a second determination that the information in the second portion of the document does not meet the second network user requirement. The processor assigns a confidence interval for the first and second determinations. Finally, the processor generates a report that includes the first and second determinations, the confidence intervals for the first and second determinations, an identifier of the first network user requirement, and an identifier of the second network user requirement.

As discussed above in the background section, existing approaches to assessing documents bearing on an entity's information security protocols allows network vulnerabilities to go undetected for longer periods of time. Certain embodiments of this disclosure provide unique solutions to technical problems of the existing approaches to assessing documents bearing on an entity's information security protocols by automatically completing an information security questionnaire based on information extracted from a variety of non-standard documents. For example, the disclosed system provides technical advantages which include 1) identification of portions of documents—some comprising structured data, some comprising unstructured data, and other comprising a mix of both—that are responsive to questions about an entity's information security measures, 2) continuously improving identification of information responsive to questions about an entity's information security measures by use of mapping tables that can be updated when new document types are processed, and 3) identification of the types of security measures that the entity should perform to remedy any deficiencies identified in the processed documents.

Accordingly, the system described herein provides a practical application of determining whether there are any information security gaps in an entity's current protocols and to identify ways to fill those gaps. This, in turn, reduces the potential weak points that malicious actors can use to access the user's sensitive data through third parties that provide services or products to the user. Moreover, it reduces the computing resources necessary to detect and counteract intrusions on the network.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 illustrates an example report that is generated in the example method of FIG. 3.

DETAILED DESCRIPTION

System Overview

Figure 1:
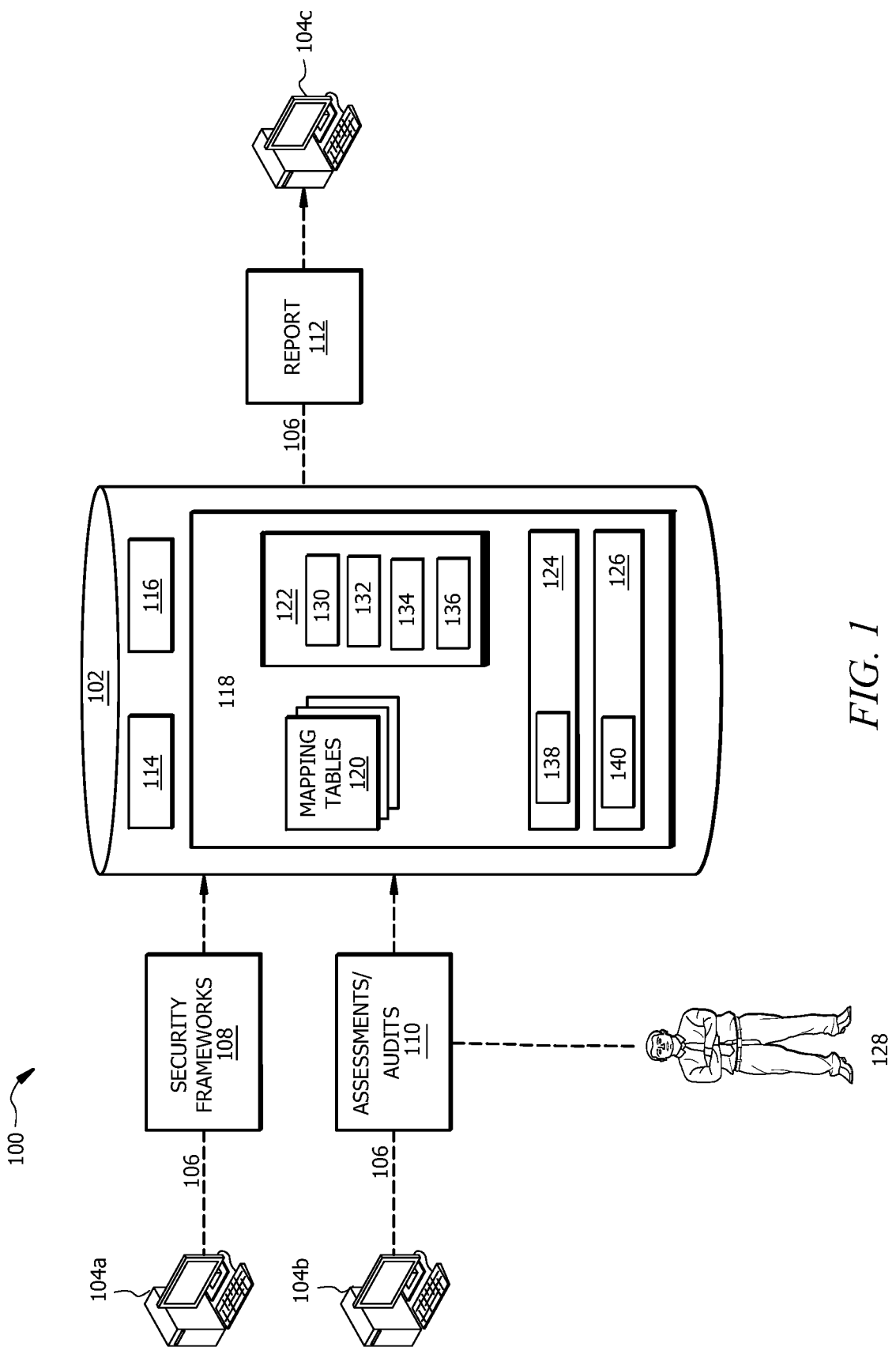
FIG. 1 illustrates an example information security assessment system.

FIG. 1 illustrates an example information security assessment system 100. In one embodiment, the system 100 comprises a compliance server 102 and a plurality of user devices 104. The compliance server 102 is in signal communication with the user devices 104 through network 106. Compliance server 102 generally uses known matches between assessment questions and security frameworks 108 to create mapping tables 120 which are used train a machine learning algorithm that in turn is used to analyze assessment and audit documents 110. After performing its analysis, the compliance server 102 generates one or more reports 112. Additional details about the security frameworks 108, assessment and audit documents 110, and reports 112 are provided in the discussions of FIGS. 2-4.

Network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

User devices 104 are devices capable of sending data to and receiving data from compliance server 102. For example, the user devices 104a and 104b send security frameworks 108 and assessments and audits 110, respectively, to the compliance server 102, while the user device 104c receives one or more reports 112 from the compliance server 102. The user devices 104a-c are illustrated as desktop computers in FIG. 1, but the user devices 104 could be smartphones, personal digital assistants, tablets, laptops, or any similar device suitable for sending and receiving data as described in this disclosure.

Compliance server 102 comprises a network interface 114, a processor 116, and a memory 118. The network interface 114 is configured to enable wired and/or wireless communications (e.g., via network 106). The network interface 114 is configured to communicate data between the compliance server 102 and other network devices (e.g., user devices 104), systems, or domain(s). For example, the network interface 114 may comprise a WIFI interface, a local area network (LAN) interface, a wide area network (WAN) interface, a modem, a switch, or a router. The processor 116 is configured to send and receive data using the network interface 114. The network interface 114 may be configured to use any suitable type of communication protocol as would be appreciated by one of ordinary skill in the art.

Processor 116 comprises one or more processors operably coupled to network interface 144 and memory 118. The processor 116 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 116 may be a programmable logic device, a microcontroller, a microprocessor, or any suitable combination of the preceding. The one or more processors are configured to process data and may be implemented in hardware or software. For example, the processor 116 may be 8-bit, 16-bit, 32-bit, 64-bit or of any other suitable architecture. The processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions 138 and 140 to implement translation engine 124 and report engine 126, respectively. In this way, processor 116 may be a special purpose computer designed to implement the functions disclosed herein. In an embodiment, the translation engine 124 and report engine 126 operate as described in FIGS. 2 & 4. For example, the translation engine 124 and report engine 126 may be configured to perform the steps of method 300 as described in FIG. 3.

Memory 118 comprises one or more disks, tape drives, or solid-state drives, and may be used as an over-flow data storage device, to store programs when such programs are selected for execution, and to store instructions and data that are read during program execution. The memory 118 may be volatile or non-volatile and may comprise read-only memory (ROM), random-access memory (RAM), ternary content-addressable memory (TCAM), dynamic random-access memory (DRAM), and static random-access memory (SRAM). The memory 118 is operable to store mapping tables 120, reference data 122, translation engine 124, and report engine 126. The mapping tables 120, reference data 122, translation engine 124, and report engine 126 are described in more detail in FIGS. 2-4.

Reference Data

The reference data 122 includes a variety of information that is used by the translation engine 124 and report engine 126. The reference data 122 may include a plurality of network user requirements 130. The user of system 100 can define any number of network user requirements 130 that third parties engaging with the user of system 100 must comply. For example, the network user requirements 130 may include a requirement that user passwords be of a minimum length (e.g., 8 characters), all mobile devices with access to the network must employ encryption software, and all computers with access to the network must run anti-virus software. These examples are not limiting, and one of ordinary skill in the art will appreciate that a wide variety of network requirements may be established to minimize the risk of network intrusion.

Reference data 122 may also include, for each network user requirement 130, a plurality of metrics 132 that satisfy that network user requirement 130. For example, if the network user requirement 130 is that all computers with access to the network must run anti-virus software, the corresponding metric 132 may include a list of common anti-virus software programs. That way, compliance with network user requirement 130 may be verified by identifying one of the anti-virus software programs listed in metrics 132 in the assessment and audit documents 110. As another example, the metrics 132 that corresponds to the network user requirement 130 that passwords be at least 8 characters in length may be that any password exceeding 7 characters in length is satisfactory. The user of system 100 can modify the metrics 132 for each network user requirement 130 so that the relevant criteria for measuring compliance is more or less strict based on the needs of the user.

Reference data 122 may further include plurality of previous responses 134 to questionnaires about the level of compliance with network user requirements 130 by various entities interacting with the user of system 100. The previous responses 134 may be grouped as responses that were determined to meet a given network user requirement 130 and responses that were determined not to meet that network user requirement 130. This data set may then be used by report engine 126 to assign a confidence interval to classifications that it makes based on incoming assessment and audit documents 110.

The reference data 122 may also include a list of confidence thresholds 136 against which report engine 126 may evaluate its performance. The examined documents may provide seemingly conflicting information, and the thresholding analysis allows the disclosed system to distinguish noise generated by inaccurate optical character recognition from scenarios where the information is truly in conflict and in need of further investigation. For example, the user of system 100 may set the confidence threshold 136 at 90%. Determinations by report engine 126 that have a confidence interval below 90% may be flagged for additional review and analysis. Additional details about the role of reference data 122 and confidence thresholds 136 are provided below in the discussions of FIGS. 2-5.

Translation Engine

Figure 2:
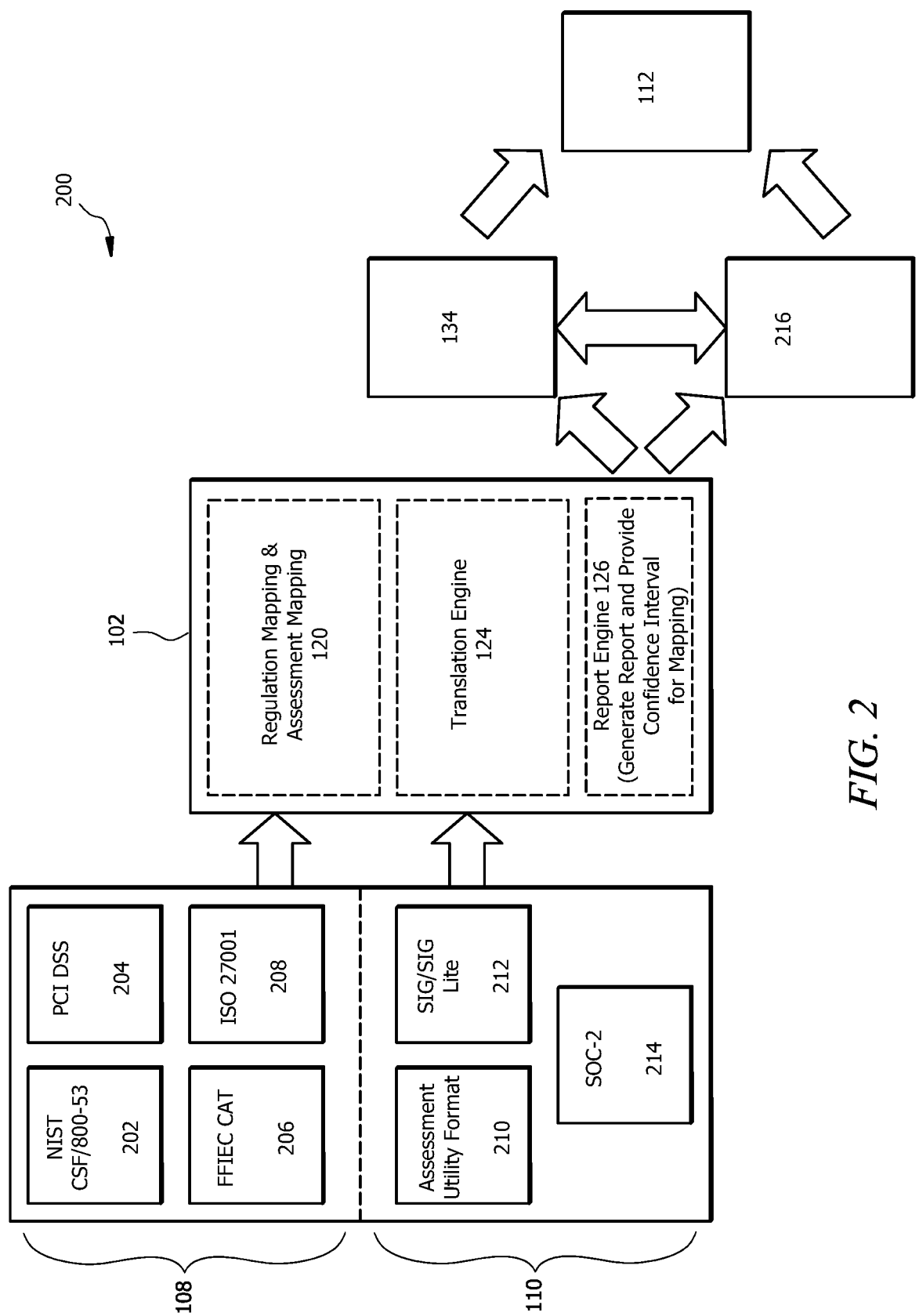
FIG. 2 illustrates the function of a translation engine and a report engine in the example system depicted in FIG. 1.

The translation engine 124 may include or be provided with software instructions 138 stored on memory 118 and executed by processor 116. FIG. 2 illustrates the function of the translation engine 124 from the example system 100 depicted in FIG. 1. The translation engine 124 is configured to receive a plurality of assessment and audit documents 110. Generally, the assessment and audit documents 110 provide information about the information security procedures of an entity 128. The entity 128 may be a business that provides products or services to the user of system 100. Entity 128 may have access to one or more networks of the user of system 100. The entity 128 may also have access to sensitive information of the user of system 100. The assessment and audit documents 110 comprise a variety of information relevant to the information security protocols of entity 128. For example, the assessment and audit documents 110 may include information about the physical security measures that entity 128 takes to secure data at its offices and on the devices of its employees. The assessment and audit documents 110 may also include information about the digital security measures, such as security software used and user login security protocols, that entity 128 takes to secure access to data on its own networks. While the information security compliance questionnaires in this disclosure are referred to as network user questionnaires, the entity 128 is not necessarily using the network of the user of system 100. Network user more broadly encompasses any entities that exchanges digital information with the user of system 100.

The assessment and audit documents 110 may be received in a variety of formats. Assessment and audit documents 110 may comprise structured data, unstructured data, semi-structured data, or any combination of such data. The assessment and audit documents 110 may be generated by the entity 128 or a third party that reviews the information security profile of the entity 128. For example, the assessment and audit documents 110 may include an assessment utility format document 210, a SIG or SIG Lite document 212, and a SOC-2 document 214.

After receiving the assessment and audit documents 110, the translation engine 124 uses the mapping tables 120 to determine which information in the received assessment and audit documents 110 constitute answers to questions about whether entity 128 is complying with the network user requirements defined by the user of system 100.

The mapping tables 120 enable the compliance server 102 to identify information in the assessment and audit documents 110 that are responsive to questions about the compliance of entity 128 with network user requirements set by the user of system 100. A first mapping table 120 may link questions in a security framework 108 to statutes or other regulatory provisions. Examples of industry frameworks 108 include framework 202, NIST CSF/800-53; framework 204, PCI DSS; framework 206, FFIEC CAT; and framework 208, ISO 27001. Various other information security frameworks exist and are likely to be developed in the future. One of ordinary skill will appreciate that any such framework may be integrated into the disclosed systems and methods.

Another mapping table 120 may link the statutes or other regulatory provisions to questions in a network user questionnaire 216. The network user questionnaire 216 includes questions posed to determine compliance with network user requirements 130. By reviewing these mapping tables 120, the compliance server 102 may determine which portions of a security framework 108 correspond to a given portion of the network user questionnaire 216. Similarly, another mapping table 120 may link portions of different types of assessment or audit documents 110 to statutes or regulatory provisions. This allows compliance server 102 to determine which portions of an assessment or audit document 110 corresponds to a given portion of the network user questionnaire 216. Still other mapping tables 120 may link portions of different types of assessments or audit documents 110 to portions of a security framework 108.

The mapping tables may also be used to process non-standard documents that contain information about an entity's compliance with network user requirements. For such unstructured documents, the translation engine 124 is configured to use natural language processing to identify relevant keywords and phrases that might bear on an entity's compliance with network user requirements. One or more of the mapping tables 120 are configured to link the relevant words and phrases to individual sections of the network user questionnaire 216. For example, the translation engine 124 may receive an assessment document 110 that is unstructured, and it may identify the word "password" somewhere in the document. The translation engine 124 may further use the context of the phrase "password" to extract the longer phrase "user login passwords on company computers must be at least 6 characters in length and contain at least one special character." A mapping table 126 may map the keyword "password" to question one of a network user questionnaire 216, that asks the entity 128 whether it requires passwords on company devices to be at least 8 characters in length.

The mapping tables 120 may be updated as new document types are received. For example, if an assessment document 110 is received and is of a type that the compliance server 102 does not recognize, the compliance server 102 may identify portions of the assessment document 110 and predict which question in the network user questionnaire 216 to which the information is responsive. The user of system 100 may review these determinations and either confirm their accuracy or correctly classify the information so that the compliance server 102 will correctly recognize that type of document in the future.

Figure 3:
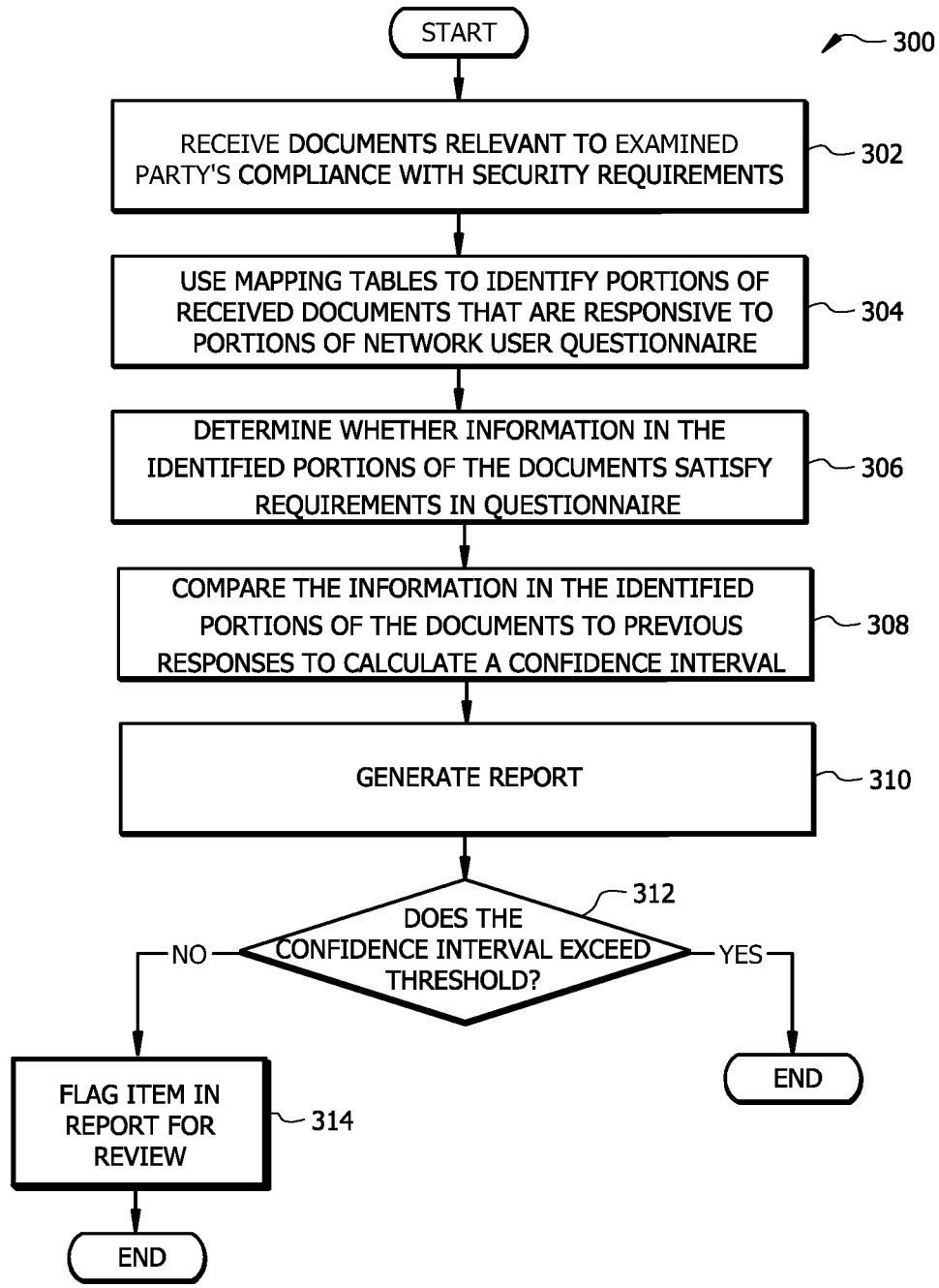
FIG. 3 illustrates one embodiment of an operational flow of the system depicted in FIG. 1.
Figure 4:
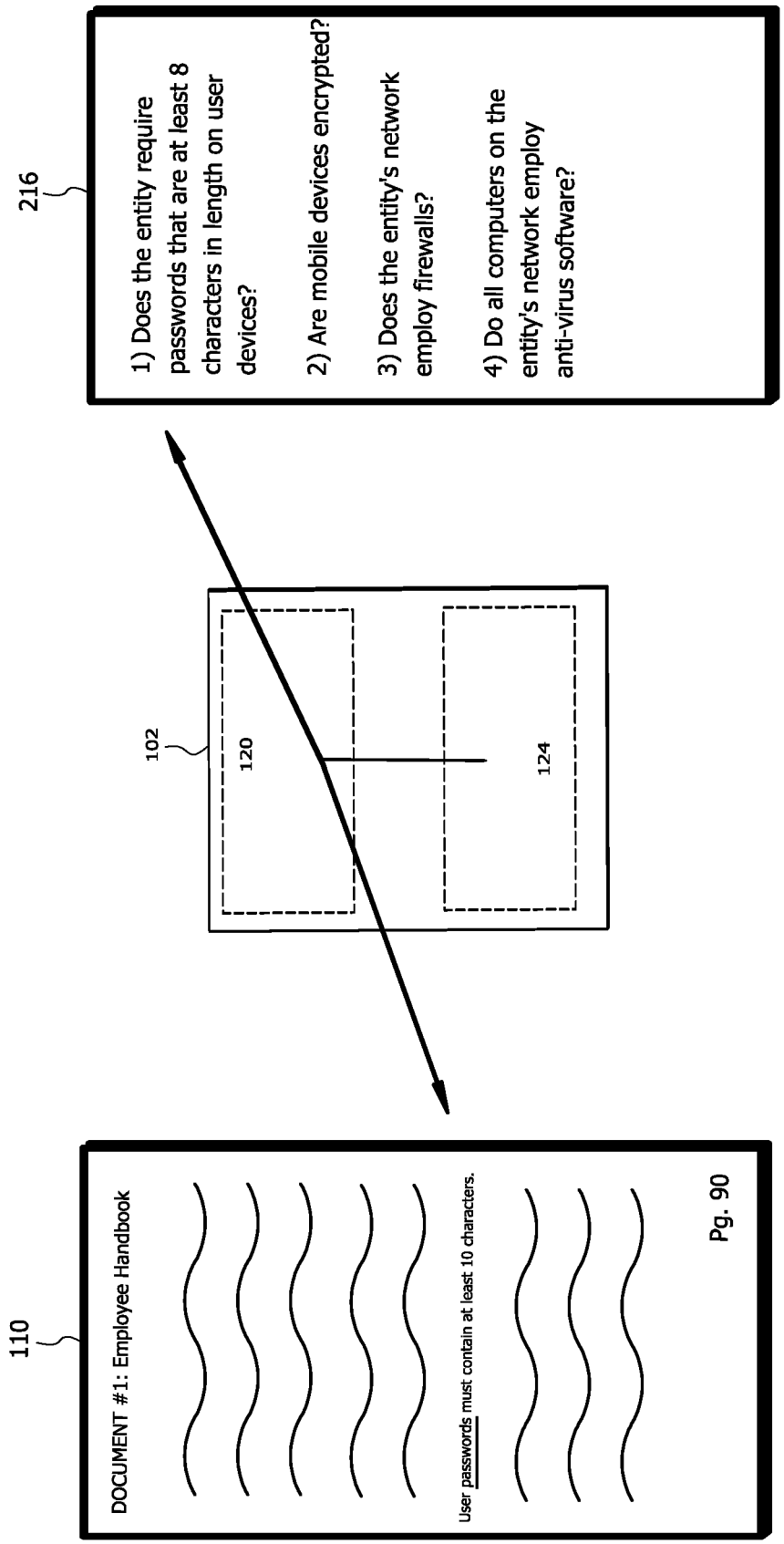
FIG. 4 illustrates the use of mapping tables in the operational flow of FIG. 3.

Additional details about the operation of translation engine 124 are provided in conjunction with the discussion of FIGS. 3 & 4.

Report Engine

The report engine 126 may include or be provided with software instructions 140 stored on memory 118 and executed by processor 116. FIG. 2 illustrates the function of the report engine 126 from the example system 100 depicted in FIG. 1. The general role of the report engine 126 is to produce a report 112 that comprises answers to questions from a network user questionnaire 216, citations to portions of the assessment and audit documents 110 that support those answers, and a confidence interval rating the answers' accuracy. The report 112 is discussed in more detail in FIG. 5.

The answers are collected from portions of one or more of the assessment and audit documents 110 identified by the translation engine 124. The questions in network user questionnaire 216 relate to network user requirements that entity 128 must comply with when providing services or products to the user of compliance server 102. For example, the network user questionnaire 216 might ask the entity 128 whether its employees are all required to have passwords on their electronic devices that are at least 8 characters in length, whether all of the mobile devices using its networks utilize data encryption, whether the entity's network contains a firewall, and whether the entity 128 uses approved antivirus software on its devices. The network user questionnaire 216 may include various other questions relevant to determining whether entity 128 complies with information security protocols required by the user of compliance server 102. For example, some of the questions may be like those in one or more of the industry frameworks 108.

Once information is identified as responsive to a question in network user questionnaire 216, the report engine 126 evaluates whether the response indicates that entity 128 complies with the network user requirement. This is accomplished by comparing the information with the metrics 132 that satisfy the corresponding network user requirement 130. The report engine 126 may search for an exact match between the information and a metric 132, or it may search for similar answers. The report engine 126 performs a thresholding step to evaluate how accurate its classification—i.e., in compliance or out of compliance—is based on the comparison to metrics 132.

The thresholding step involves calculating a confidence interval for answer in the completed network user questionnaire 216. Confidence intervals are established by comparing the answer to the previous responses 134. Based on the similarity to the previous responses 134, the report engine assigns a confidence interval. For example, an answer that was determined to comply with the network user requirement 130 by the report engine 126 would be expected to exhibit a greater similarity with the previous responses 134 classified as complying with the network user requirement 130 than with the previous responses 134 classified as not complying with the network user requirements 130. The determination would be given a lower confidence interval if the answer exhibited greater similarity with the previous responses 134 classified as not complying with the network user requirements 130 than the previous responses 134 classified as complying with the network user requirement 130. Report engine 126 then compares the calculated confidence interval to a threshold 136. The user of system 100 may configure a different threshold 136 for each question in the user questionnaire 216 or configure a single threshold 136 to apply to every question. Questions for which the threshold is not exceeded may be flagged for further analysis.

In some embodiments, the report engine 126 is configured to determine what the entity 128 needs to do to comply with a network user requirement 130 which the report engine 128 found it did not meet based on the review of the assessment and audit documents 110. For example, the report engine 126 may inform the entity 128 of the metrics 132 that satisfy the network user requirement 130.

Finally, the report engine 126 is configured to incorporate the answers to the user questionnaire 216 and the calculated confidence intervals into a report 112 that is viewable by users of the compliance server 102. The report 112 may be in the form of a text file or a spreadsheet. The report 112 may be displayed on a computer display, such as on user device 104*c*, or printed on paper. The report 112 may appear as a network user questionnaire 216 that has the blanks filled in.

The report 112 generally displays the questions from network user questionnaire 216, the answers to those questions as determined by the report engine 126, references to the portions of the assessment and audit documents 110 from which those answers were collected, and the confidence interval assigned to each answer. In some embodiments the report 112 further concludes citations to the statutes or other regulatory provisions that are relevant for each question of the network user questionnaire 216. In yet other embodiment the report 112 includes an indication of what conditions need to change so that compliance requirements that are indicated as not met in the report 112 can be met upon reassessment. Additional details about the operation of report engine 126 are provided in conjunction with the operation flow illustrated in FIG. 3 and the illustrated report in FIG. 5.

Operational Flow

FIG. 3 illustrates one embodiment of an operational flow of the system 100 depicted in FIG. 1. The method 300 is initiated at step 302 when the compliance server 102 receives documents relevant to the examined party's compliance with information security requirements that are outlined in a network user questionnaire 216. The documents are received in the form of assessments and audits 110. As discussed above, the received documents may comprise structured, semi-structured, and/or unstructured data. For example, the assessments and audits 110 may be structured reports or unstructured documents that contain information relevant to the audited party's (e.g., entity 128) compliance with the network user requirements.

At step 304, information in the received assessments and audits 110 is identified that is responsive to one or more questions in a network user questionnaire 216. As detailed in the sections above, the translation engine 124 uses mapping tables 120 to detect information in the assessment and audit documents 110, and to correlate that information with the question or questions in the network user questionnaire 216 to which it is responsive. For example, in FIG. 4, the translation engine 124 identifies the keyword "password" in line 6 of page 90 of the illustrated assessment document 110. In this example, the assessment document 110 is an employee handbook for entity 128. Having identified the keyword "password," the translation engine 124 references a mapping table 120 to determine that this information correlates to question 1 of the network user questionnaire 216. The translation engine 124 analyzes the context of the keyword "password" in the identified portion of the assessment document 110 and extracts the relevant information to answering the question 1 of network user questionnaire 216. In the example of FIG. 4, the translation engine 124 extracts that the entity 128 requires its employees to maintain passwords of at least 10 characters in length on user devices. This information may then be used by the report engine 126 when it is assessing the compliance of entity 128 with the network user requirements. This process is carried out on each document received by the compliance server 102.

Returning to FIG. 3, the method 300 proceeds to step 306 where the report engine 126 determines whether the information identified at step 304 satisfies the requirements in the network user questionnaire 216 to which that information relates. Continuing with the example of FIG. 4, the report engine 126 compares the information identified on line 6 of page 90 of the example document 110—"User passwords must contain at least 10 characters"—to the metrics 132 that satisfy the requirement found in question 1 of the example questionnaire 216. The metrics 132 for this question would include an indication that passwords of any length greater than or equal to eight characters satisfies the requirement. Thus, in this example the response engine 126 would determine that the requirement is met. This process is repeated for each of the questions in the network user questionnaire 216 for which relevant information was identified in the assessment and audit documents 110.

Returning to FIG. 3, the method 300 continues at step 308 where the report engine 126 calculates a confidence interval for the determinations it made at step 306. The confidence intervals are calculated by comparing the answers identified for each question in the network user questionnaire 216 to the previous responses 134. In the example of FIG. 4, the report engine 126 would compare the answer "10 characters" to the previous responses 134 for question one of the example network user questionnaire 216. The report engine 134 then determines that the answer is significantly more like the previous responses 134 classified as meeting the requirement in question one of the example network user questionnaire than the previous responses 134 classified as not meeting the requirement. Thus, it assigns a high confidence interval. The calculated confidence interval may be expressed as a percent value. For example, the report engine 126 might calculate a confidence interval of 92% for its determination that the requirement that passwords be at least eight characters in length, as asked in question one of the example network user questionnaire 216, is met. As will be discussed below, various actions may be taken depending on whether the calculated confidence intervals exceed a threshold.

Once more returning to FIG. 3, the method 300 advances to step 310 where a report 112 is generated. FIG. 5 illustrates an example report. The report 112 may include a list of questions 500 that correspond to the questions posed in network user questionnaire 216, an indicator 502 as to whether the requirement investigated by the corresponding question 500 is met, citations 504 to supporting documentation, and a confidence interval 506. The questions 500 of FIG. 5 are illustrated to match those of the network user questionnaire 216 illustrated in FIG. 4. In the example of FIG. 4, the first question 500 was determined to be met, so the indicator 502 is affirmative. The citation 504 includes a document identifier ("DOCUMENT #1"), the page number on which the information used to make the determination was found (pg. 90), and a citation to the line in which that information appears. The citation 504 may include greater or smaller amount of information. As one of ordinary skill in the art will appreciate, the format of the citations 504 will differ based on the type of document from which information was harvested. Finally, the confidence interval 506 for the first question 500 is included.

Returning finally to FIG. 3, the method proceeds to step 312 where the report engine 126 determines whether the confidence interval for each determination made at step 306 exceeds a threshold. The threshold is adjustable by the user of system 100. The higher the threshold applied, the more likely the determinations made by compliance server 102 may be accepted without concerns about the accuracy of the determination. For example, the entity controlling compliance server 102 may set the threshold at 90% confidence interval. In the example of FIG. 5, the threshold would be exceeded for all but the question 500 about antivirus software. Because the threshold was not exceeded, that question 500 would be flagged by the report engine 126 for further review.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for assessing information security in a network, comprising:
   a memory configured to store a plurality of network user requirements and a plurality of metrics that meet the network user requirements;
   a hardware processor communicatively coupled to the memory, configured to:
      identify, in a first document associated with a network user:
         a first portion of the first document that contains information that is responsive to answering a first question about the network user's compliance with a first network user requirement, wherein the first network user requirement corresponds to a first metric to which a user device associated with the network user is required to comply to securely access the network;
         a second portion of the first document that is responsive to answering a second question about the network user's compliance with a second network user requirement, wherein the second network user requirement corresponds to a second metric to which the user device associated with the network user is required to comply to securely access the network, the second metric being different from the first metric;
      compare the information in the first and second portions of the first document with the plurality of the metrics that meet the network user requirements, and make:
         a first determination that the information in the first portion of the first document answers the first question about the network user's compliance and meets the first network user requirement;
         a second determination that the information in the second portion of the first document does not answer the second question about the network user's compliance and does not meet the second network user requirement;

assign a confidence interval for the first and second determinations; and generate a report comprising the first and second determinations, the confidence intervals for the first and second determinations, an identifier of the first network user requirement, and an identifier of the second network user requirement.

2. The system of claim 1, wherein:

the memory is further configured to store:

a first set of previous responses, comprising previous responses classified as meeting the first network user requirement;

a second set of previous responses, comprising previous responses classified as not meeting the first network user requirement;

a third set of previous responses, comprising previous responses classified as meeting the second network user requirement;

a fourth set of previous responses, comprising previous responses classified as not meeting the second network user requirement; and wherein assigning the confidence interval for the first and second determinations comprises comparing the information in the first portion that answers the first question about the network user's compliance associated with the first determination to the first and second set of previous responses, and comparing the information in the second portion that answers the second question about the network user's compliance associated with the second determination to the third and fourth set of previous responses.

3. The system of claim 2, wherein the hardware processor is further configured to:

determine that the confidence interval for the first determination or second determination does not exceed a threshold; and flag the determination for which the threshold is not exceeded for further review.

4. The system of claim 2, wherein the hardware processor is further configured to determine what the network user needs to change for network user to comply with the second network user requirement.

5. The system of claim 1, wherein the first document comprises structured data, and wherein the hardware processor is further configured to:

identify, in a second document associated with the network user, the second document comprising unstructured or semi-structured data, a portion of the second document that contains information that is responsive to answering a third question about the network user's compliance with a third network user requirement;

compare the information in the identified portion of the second document with the plurality of the metrics that meet the third network user requirement to make a third determination that the information in the identified portion of the second document meets the third network user requirement;

assign a confidence interval for the third determination; and generate a report comprising the third determination, the confidence interval for the third determination, and an identifier of the third network user requirement.

6. The system of claim 1, wherein the hardware processor is further configured to cause to be displayed on a display references to the locations of the first and second portions of the first document.

7. The system of claim 6, wherein the references comprise a document identifier, a page identifier, or a section identifier.

8. A method for assessing information security in a network, comprising:

identifying, in a first document associated with a network user:

a first portion of the first document that contains information that is responsive to answering a first question about the network user's compliance with a first network user requirement, wherein the first network user requirement corresponds to a first metric to which a user device associated with the network user is required to comply to securely access the network;

a second portion of the first document that is responsive to answering a second question about the network user's compliance with a second network user requirement, wherein the second network user requirement corresponds to a second metric to which the user device associated with the network user is required to comply to securely access the network, the second metric being different from the first metric;

comparing the information in the first and second portions of the first document with a plurality of the metrics, stored in a memory, that meet network user requirements;

making a first determination that the information in the first portion of the first document answers the first question about the network user's compliance and meets the first network user requirement;

making a second determination that the information in the second portion of the first document does not answer the second question about the network user's compliance and does not meet the second network user requirement;

assigning a confidence interval for the first and second determinations; and generating a report comprising the first and second determinations, the confidence intervals for the first and second determinations, an identifier of the first network user requirement, and an identifier of the second network user requirement.

9. The method of claim 8, wherein assigning a confidence interval comprises:

comparing the information in the first portion that answers the first question about the network user's compliance associated with the first determination to:

a first set of previous responses stored in the memory, comprising previous responses classified as meeting the first network user requirement;

a second set of previous responses stored in the memory, comprising previous responses classified as not meeting the first network user requirement; and comparing the information in the second portion that answers the second question about the network user's compliance associated with the second determination to:

a third set of previous responses stored in the memory, comprising previous responses classified as meeting the second network user requirement;

a fourth set of previous responses stored in the memory, comprising previous responses classified as not meeting the second network user requirement.

10. The method of claim 9, further comprising:

determining that the confidence interval for the first determination or second determination does not exceed a threshold; and flagging the determination for which the threshold is not exceeded for further review.

11. The method of claim 9, further comprising determining what the network user needs to change for network user to comply with the second network user requirement.

12. The method of claim 8, wherein the first document comprises structured data, the method further comprising:
   identifying, in a second document associated with the network user, the second document comprising unstructured or semi-structured data, a portion of the second document that contains information that is responsive to answering a third question about the network user's compliance with a third network user requirement;
   comparing the information in the identified portion of the second document with the plurality of the metrics that meet the network user requirements to make a third determination that the information in the identified portion of the second document meets the third network user requirement;
   assigning a confidence interval for the third determination; and
   generating a report comprising the third determination, the confidence interval for the third determination, and an identifier of the third network user requirement.

13. The method of claim 8, further comprising causing to be displayed on a display references to the locations of the first and second portions of the document.

14. The method of claim 13, wherein the references comprise a document identifier, a page identifier, or a section identifier.

15. A computer program comprising executable instructions stored in a non-transitory computer-readable medium that when executed by a processor causes the processor to:
   identify, in a first document associated with a network user:
      a first portion of the first document that contains information that is responsive to answering a first question about the network user's compliance with a first network user requirement, wherein the first network user requirement corresponds to a first metric to which a user device associated with the network user is required to comply to securely access the network;
      a second portion of the first document that is responsive to answering a second question about the network user's compliance with a second network user requirement, wherein the second network user requirement corresponds to a second metric to which the user device associated with the network user is required to comply to securely access the network, the second metric being different from the first metric;
   compare the information in the first and second portions of the first document with a plurality of the metrics that meet the network user requirements, and make:
      a first determination that the information in the first portion of the first document answers the first question about the network user's compliance and meets the first network user requirement;
      a second determination that the information in the second portion of the first document does not answer the second question about the network user's compliance and does not meet the second network user requirement;
   assign a confidence interval for the first and second determinations; and
   generate a report comprising the first and second determinations, the confidence intervals for the first and second determinations, an identifier of the first network user requirement, and an identifier of the second network user requirement.

16. The computer program of claim 15, wherein assign a confidence interval comprises:
   comparing the information in the first portion that answers the first question about the network user's compliance associated with the first determination to a first and a second set of previous responses, the first set of previous responses comprising previous responses classified as meeting the first network user requirement, and the second set of previous responses comprising previous responses classified as not meeting the first network user requirement; and
   comparing the information in the second portion that answers the second question about the network user's compliance associated with the second determination to the third and fourth set of previous responses, the third set of previous responses comprising previous responses classified as meeting the second network user requirement, and the fourth set of previous responses comprising previous responses classified as not meeting the second network user requirement.

17. The computer program of claim 16, wherein the processor is further configured to:
   determine that the confidence interval for the first determination or second determination does not exceed a threshold; and
   flag the determination for which the threshold is not exceeded for further review.

18. The computer program of claim 16, wherein the processor is further configured to determine what the network user needs to change for network user to comply with the second network user requirement.

19. The computer program of claim 15, wherein the first document comprises structured data, and wherein the processor is further configured to:
   identify, in a second document associated with the network user, the second document comprising unstructured or semi-structured data, a portion of the second document that contains information that is responsive to answering a third question about the network user's compliance with a third network user requirement;
   compare the information in the identified portion of the second document with the plurality of metrics that meet the network user requirement to make a third determination that the information in the identified portion of the second document meets the third network user requirement;
   assign a confidence interval for the third determination; and
   generate a report comprising the third determination, the confidence interval for the third determination, and an identifier of the third network user requirement.

20. The computer program of claim 16, wherein the processor is further configured to cause to be displayed on a display references to the locations of the first and second portions of the document.

* * * * *